US011495052B1

United States Patent
Timoner et al.

(10) Patent No.: US 11,495,052 B1
(45) Date of Patent: *Nov. 8, 2022

(54) ENTRY PREVENTION OF PERSONS OF INTEREST FROM VENUES AND EVENTS USING FACIAL RECOGNITION

(71) Applicant: Wicket, LLC, Cambridge, MA (US)

(72) Inventors: Samson Timoner, Doylestown, PA (US); Robert Banks, Doylestown, PA (US); Kelly A. Bucey, Doylestown, PA (US); Patrick L. Quinlan, Doylestown, PA (US); Gennady Livitz, Doylestown, PA (US); Sanjay Manandhar, Doylestown, PA (US)

(73) Assignee: Wicket, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,803

(22) Filed: Mar. 9, 2021

Related U.S. Application Data

(63) Continuation of application No. 16/409,422, filed on May 10, 2019, now Pat. No. 11,010,597.

(60) Provisional application No. 62/669,698, filed on May 10, 2018.

(51) Int. Cl.
  *G06V 40/16* (2022.01)
  *G07C 9/37* (2020.01)

(52) U.S. Cl.
  CPC .............. *G06V 40/172* (2022.01); *G07C 9/37* (2020.01)

(58) Field of Classification Search
  CPC .............................. G06V 40/172; G07C 9/37
  See application file for complete search history.

(56) References Cited

U.S. PATENT DOCUMENTS

| | | | |
|---|---|---|---|
| 6,792,618 B1 | 9/2004 | Bendinelli et al. | |
| 7,403,920 B2 | 7/2008 | Nishikiori et al. | |
| 8,154,615 B2 | 4/2012 | Fedorovskaya et al. | |
| 8,448,056 B2 | 5/2013 | Pulsipher et al. | |
| 9,412,180 B2 | 8/2016 | Ono et al. | |
| 9,672,535 B2 | 6/2017 | Higgins | |
| 9,691,074 B2 | 6/2017 | Fan et al. | |
| 2006/0044446 A1 | 3/2006 | Porter et al. | |
| 2009/0080715 A1 | 3/2009 | van Beek et al. | |
| 2013/0236072 A1 | 4/2013 | Sun | |
| 2014/0337066 A1 | 7/2014 | Kephart | |
| 2016/0063316 A1 | 3/2016 | Lee et al. | |
| 2016/0086015 A1 | 3/2016 | Irmatov et al. | |
| 2016/0171346 A1 | 6/2016 | Han et al. | |
| 2016/0350334 A1 | 12/2016 | Bataller et al. | |
| 2018/0027272 A1 | 1/2018 | Raj et al. | |

(Continued)

OTHER PUBLICATIONS

U.S. Appl. No. 16/409,422, Entry Prevention of Persons of Interest From Venues and Events Using Facial Recognition.

(Continued)

*Primary Examiner* — Casey L Kretzer
(74) *Attorney, Agent, or Firm* — Davis Malm D'Agostine, P.C.; David J. Powsner

(57) ABSTRACT

A system uses facial recognition to exclude persons of interest (e.g., "undesirables") from events and/or venues. Such a system can include a combination of cameras, edge processing devices, and servers that are in communications coupling (e.g., via a network) and that are on premise and/or in the cloud to recognize such persons of interest (POI) and interdict and prevent such POI from entering, traversing, and/or attending (collectively, "entering") such venues or events.

12 Claims, 1 Drawing Sheet

(56) References Cited

U.S. PATENT DOCUMENTS

| | | |
|---|---|---|
| 2018/0032796 A1 | 2/2018 | Kuharenko et al. |
| 2019/0005310 A1 | 1/2019 | Kim |
| 2019/0130167 A1 | 5/2019 | Ng et al. |
| 2020/0257889 A1 | 8/2020 | Merkel et al. |

OTHER PUBLICATIONS

U.S. Appl. No. 16/679,021, System and Method for Facial Recognition Accuracy.
U.S. Appl. No. 16/880,467, Self-Correcting Face Detection Pipeline-Based Method and Apparatus for Censusing a Crowd.
U.S. Appl. No. 63/016,957, System and Method for Access Control Using a Plurality of Images.
U.S. Appl. No. 17/195,803, Entry Prevention of Persons of Interest from Venues and Events Using Facial Recognition.

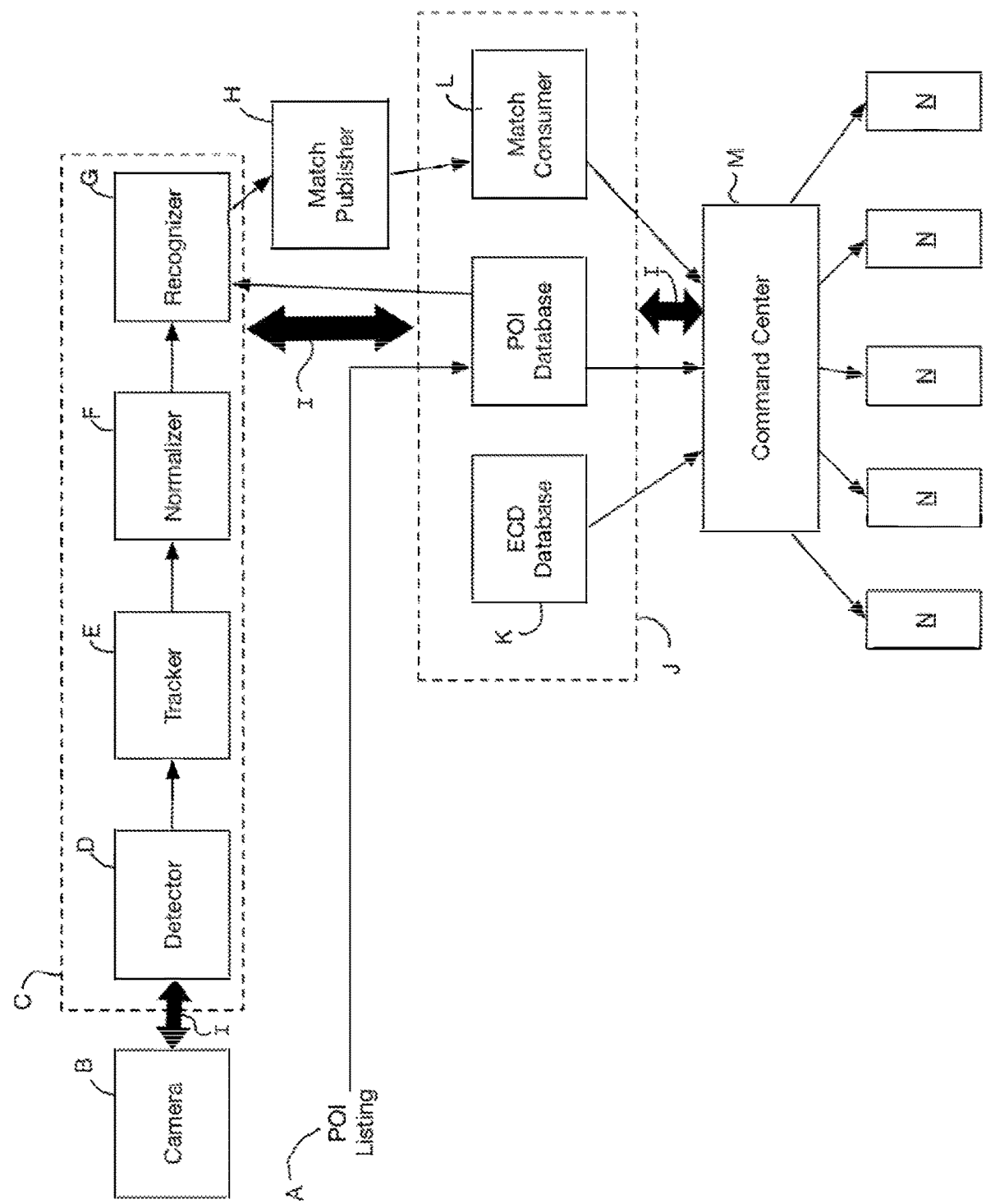

ENTRY PREVENTION OF PERSONS OF INTEREST FROM VENUES AND EVENTS USING FACIAL RECOGNITION

BACKGROUND OF THE INVENTION

This is a continuation of U.S. patent application Ser. No. 16/409,422, filed May 10, 2019, entitled ENTRY PREVENTION OF PERSONS OF INTEREST FROM VENUES AND EVENTS USING FACIAL RECOGNITION, which claims the benefit of filing of U.S. Provisional Patent Application Ser. No. 62/669,698, filed May 10, 2018, and entitled "Use of Facial Recognition to exclude Persons of Interest from High Value Events or High Value Venues," the teachings of all of which are incorporated herein by reference.

The computer program listing contained in the ASCII file named "sourceCode-ISOLatin1encode.txt", created Aug. 30, 2022, having a length of 96,484 bytes, submitted herewith to the USPTO in compliance with MPEP 608.05 is incorporated by reference herein.

The Invention relates to digital data processing, digital image analysis, facial recognition, and/or computer-mediated security systems. The invention has application, by way of non-limiting example, in security systems for public events and/or venues.

A problem for police, private security details and others is how to quickly detect persons that are not desirable at sporting events, concerts, or other events and/or at company facilities, military bases or sporting stadiums or other venues. The purpose of such detection is to facilitate protecting other persons, such as fans, employees, etc., and facilities from potential harm from such undesirables. If the number of persons at those events and/or venues is large (e.g., some popular concerts may have 70,000 people who attend), finding a few undesirables can be difficult if not virtually impossible.

An object of the invention is to provide improved systems, apparatus and methods for digital data processing, digital image analysis, facial recognition, and/or computer-mediated security systems. A further objects to provide such systems, apparatus and methods as are suitable for detecting undesirables at public and other events and/or venues.

SUMMARY OF THE INVENTION

The foregoing are among the objects attained by the invention, which provides in some aspects a system which uses facial recognition to exclude persons of interest (e.g., "undesirables") from events and/or venues. Such a system can include a combination of cameras, edge processing devices, and servers that are in communications coupling (e.g., via a network) and that are on premise and/or in the cloud to recognize such persons of interest (POI) and interdict and prevent such POI from entering, traversing, and/or attending (collectively, "entering") such venues or events.

Further aspects of the invention provide a system, e.g., as described above, wherein each camera is connected to an edge computing device (ECD) to keep a local listing (or database) of the one or more POI listings and to take a continuous stream of video coming from the camera connected to the ECD and start processing it and matching against the POI.

Further aspects of the invention provide a system, e.g., as described above, wherein multiple streams of video are taken from multiple cameras; wherein there is a one-to-one mapping of a camera to an ECD; and wherein multiple software modules are running on the ECD which together form the processing unit for facial detection.

Further aspects of the invention provide a system, e.g., as described above, wherein a detector is tasked with detecting a particular image, such as a face, the detector takes each frame of the video stream and with algorithms it is loaded with, will detect all faces in the frame, will mark each face in a particular way, will also give each face a unique ID or faceID, and/or will isolate the face image from the rest of the frame.

Further aspects of the invention provide a system, e.g., as described above, wherein a tracker is responsible for tracking each face from frame to frame in the video stream, the tracker recognizes that the face is either the same one or new entrant into the frame.

Further aspects of the invention provide a system, e.g., as described above, wherein a normalizer normalizes each image to a constant pixel width and height so distant faces are normalized with image processing to a preselected size and very large faces close to the camera are also reduced to the preselected size.

Further aspects of the invention provide a system, e.g., as described above, wherein a recognizer takes each normalized image of preselected sizes and compares this normalized image against each POI entry. If there are multiple POI images for each individual, each POI image is compared and a confidence score is calculated and entered in the confidence listing.

Further aspects of the invention provide a system, e.g., as described above, wherein a match publishing module not only tabulates all the confidence levels, but also prepares to publish the matches to the server above a certain threshold level set prior to the system operation.

Still further aspects of the invention provide methods paralleling one or more of the operations described above.

BRIEF DESCRIPTION OF THE DRAWINGS

A more complete understanding of the invention may be attained by reference to the drawings, in which:

FIG. 1 shows a schematic view of a facial recognition method and system in accordance with the present invention.

DETAILED DESCRIPTION OF THE ILLUSTRATED EMBODIMENT

In FIG. 1 there is shown a system and method according to the invention which uses facial recognition to exclude persons of interest from events and/or venues. The system and method comprise a combination of cameras, edge processing devices, servers that are coupled for communication (e.g., via a network or otherwise) and that may reside together on premise, remotely from one another and/or in the cloud to recognize persons of interest (POI) and interdict and prevent such POI from entering such events and/or venues.

Referring now to FIG. 1, the POI listing A comprises one or more images of a good likeness of each POI member. In the illustrated embodiment, it is contemplated that there are different classes of POI, such as the most dangerous POI named RedPOI who pose grave threat to fans at Venues, or YellowPOI, who might be considered medium risk and BluePOI for low risk, for instance. Other embodiments may vary in this regard.

The system comprises one or more cameras B that capture the video feed of the crowds at the venues. The cameras B preferably match a) the lighting conditions, b) the resolution, and 3) speeds of video capture to allow acceptable video input. The cameras may be installed in areas where security checks at entrances are occurring, but also may be installed in any appropriate areas to cover a large area sufficiently well. When physical interdiction is required the density of the camera provides a manageable area for the security personnel to locate the POI detected.

Each camera B comprises a conventional video or still image capture device of the type available in the marketplace suitable for acquiring image of persons and other things as adapted in accord with the teachings hereof. In the illustrated embodiment, camera B is a conventional security camera, though, in other embodiments it may be a special purpose camera of conventional or proprietary construction. And, although, only one camera B is shown in the drawing, in typical embodiments multiple cameras may be used.

Each camera B is connected to an edge computing device (ECD) C. The camera module B, which can be considered part of the Detector D serves to capture video per convention in the art as adapted in accord with the teachings hereof. For example, it can capture a h.264 video stream from a network camera transmitted using the real time stream protocol (RTSP). It can also buffer frames in a manner to make a threaded program be able to access them without creating errors. Other embodiments may, of course, vary in the aforesaid regards. A further appreciation of the features and operations of Detector D, including image acquisition via camera B, may be attained by reference to the source code and embedded comments for the module the VideoStreamDataSource, below ECD C maintains a local listing (or store or database) of the one or more POI listings. The ECD C takes the continuous stream of video coming from the camera connected to the ECD C, starts processing that stream and matches it against the POI, reporting matches to the MatchConsumer L. The ECD may be implemented on a personal computer, workstation or other computing device, of general- or special-purpose, of the type known in the art as adapted in accord with the teachings hereof. The programming of such general- or special-purpose device to effect the operations attributable the ECD and components thereof shown and described here is within the ken of those skilled in the art in view of the teachings hereof.

Depending on how much processing power is available at the ECD C it is possible to take multiple streams of video from multiple cameras B. In the illustrated implementation, there is a one-to-one mapping of the camera B to an ECD C. There are multiple software modules running on the ECD C which together form the processing unit for facial detection.

Illustrated detector D, is tasked with detecting a particular image, in this particular case a face. The detector D takes each frame of the video stream and with algorithms it is loaded with (one preferred example is an MTCNN algorithm), will detect all faces in the frame, will mark each face in a particular way, will also give each face a unique ID (also called faceID) and will also isolate the face image from the rest of the frame. Other embodiments may vary in the aforesaid regards. A further appreciation of the features and operations of Detector D may be attained by reference to the source code and embedded comments for the classes FaceDetector and FaceDetectorMtcnn, below.

The tracker E tracks each face from frame to frame in the video stream. The purpose of this feature is if people are walking or moving around the tracker needs to recognize that the face is either the same face or new entrant into the frame (which is left for the detector to mark with a unique ID). The result is a track, which is an array of cropped images of faces to be interpreted by the Recognizer Module G, as well as other information such as the timestamps. Other embodiments may vary in the aforesaid regards. A further appreciation of the features and operations of tracker E may be attained by reference to the source code and embedded comments for the modules FaceTracker and MultiFaceTracker below.

The VideoPreprocessor (below) orchestrates the operation and co-operation of Detector D and Tracker E. It takes in a video source, finds faces, tracks the faces, and produces a groups of tracks.

Normalized F normalizes each image to a constant preselected pixel width and height, such as 160 pixels×160 pixels, though other sizes are also contemplated, so distant faces which may be only a few pixels wide and high will be normalized with image processing to the preselected size (e.g., 160×160 pixels) and larger faces, such as those close to the camera are reduced to the preselected size (160×160 pixels) as well. In general, the normalizer F prepares the face for the algorithm that will process the face into a vector, including resolution, color encoding (e.g. Blue Green Red: BGR) and the value of the pixels. Other embodiments may vary in the aforesaid regards. A further appreciation of the features and operations of normalizer F may be attained by reference to the source code and embedded comments for ResNet50_128D_FaceEmbedder (an instance of the FaceEmbedder) below. In the embodiment below, the ResNet50_128D_FaceEmbedder subtracts off a value (91.4953, 103.8827, 131.0912) to prepare the face for the embedding algorithm, which takes the face and produces a vector.

Recognizer G takes each normalized image of and compares this normalized image against each POI entry. If there are multiple POI images for each individual, each POI image is compared and a confidence score is calculated and entered in the confidence listing—close to 100% confidence suggests the detector found 100% match of the preselected size image with the POI image and 0% means a definite nonmatch. The confidence level is the mechanism which suggests a close match or a poor match of fans/visitors with the POI listing. Other embodiments may vary in these regards. A preferred instantiation of the recognizer uses the FaceEmbedder module (detailed in the source code listings and embedded comments below) to convert each face to a vector, and then a Classifier (detailed in the source code listings and embedded comments below) to find the similarity between the image and each POI. The CosineSimilarityClassifier (detailed in the source code listings and embedded comments below) uses the cosine metric between vectors, and can be used between vectors from POI images and vectors from collected images. If the similarity is high enough, a match is reported. The confidence can be reported as a scaled number based on the similarity.

The MatchPublisher H, which not only tabulates all the confidence levels, but also prepares to publish the matches to the server J, described below, above a certain threshold level set prior to the system operation. For instance, in one form of the invention a strict system may be set with a low confidence level such as 55%, but a very strict matching system may choose to only evaluate matches with confidence levels of 95% or better. MatchPublisher H keeps the image and the faceID for all matches above the confidence levels; the rest of the matches and associated data are preferably deleted to preserve storage capacity in the ECD C and also to preserve the privacy of the people in the crowd that pose no security threat. An instantiation of the Match- Publisher is the AlertingIdentifier (detailed in the source code listings and embedded comments below). The alerting identifier uses a FaceSequenceMatcher (detailed in the source code listings and embedded comments below) to decide if the track (or sequence) of faces matchers with a POI. The FaceSequenceMacher can compute the similarity of every image in the sequence with a POI, and compute an average similarity, and then check the threshold to decide if there is a match. If indeed there is a match, the largest similarity face and score is reported to the server J.

In practice, there are two methods that increase the effectiveness of the MatchPublisher. The first is to not send repeated alerts. For the instantiation of the AlertingIdentifier: it checks to see if a match has been made within a time interval. If so, it does not repeat the alert. The second is the concept of the special watch list. If the system makes an error, and an alert is sent to devices (N) incorrectly, then it is like to repeat the same error when the same person is seen later. To avoid repeated errors, a face (embedding vector) that is consistently incorrectly matched, can be recorded and effectively added as a special POIs. When subsequent examples of the same person are matched, and match the special POI, they can be ignored. A simple way to implement this functionality is to have the server J message the ECD C to add the person who is in error as a POI. Subsequent images of that person are likely to match to him or herself. When the server receives an alert for that special POI, the server can simply ignore it. Thus, repeated incorrect alerts can be avoided.

The ECD C is connected to it server J, either on the same LAN or in the Cloud via a network I, which may comprise one or more networks of the type known in the art suitable for transmission of images and/or other information of the type described herein. In some cases there may be more than one server J on the LAN, in the Cloud, or a mixture to maintain redundancy and speed. The server J fulfills a number of functions. First, it holds the POI database which is ingested prior to the system operation or is added to during operation and a copy is disseminated to each ECD C. The POI Database needs to be sent to each ECD C. In practice, the images are not sent, to keep the images of POI contained on a server. Only the embeddings from each image is sent, which can be created using the FaceEmbedder(below). And, that creates a challenge for when the algorithm to produce embeddings is updated, new vectors much be transmitted to each box. To solve this issue, the ECD C are updated first with the new algorithms, and then the POI vectors are re-downloaded. The algorithm is specified with the POI vectors. An instantiation of such a label is the EmbedderNames (detailed in the source code listings and embedded comments below).

The server J is aware of all the ECDs C and stores the in a database K. It may also be aware of their physical location. When commissioning a camera (B) and an ECD (C) associated with it, the location and perhaps desired confidence levels of detection should preferably be noted in the server (J).

The server (J) is aware of the health of each camera/ECD pair and will engage in a constant heartbeat message coming from the ECD (C). The purpose of the ECD-initiated heartbeat (and potential conversation with the server) is so that the ECD (C), which may be located inside a firewall, may connect from the inside and report quickly its status and also potential hits of high confidence levels quickly. The heartbeat rate may be made very quickly to create a very responsive system to manage a very large crowd detection or relatively slowly to minimize network bandwidth in areas where bandwidth might be difficult or expensive, such as remote areas served only by satellite phones.

In the field, cameras (B) fail in a number of ways for which the heartbeat is key. The frame rate can go to 0. The resolution can drop. The video can fail and deliver noise. The heartbeat can indicate framerate, as well as the number of faces detector during the last period. In practice, the Server (J) can have alerts set so that when number go below and above thresholds, the management team on site (holding devices N) can get messages from the command center (M) indicating problems. An instantiation of given by the HealthChecker (below). Data is collected and send to the Healthchecker, and periodically sent to the server. On the server side, (J), the CloudWatchSensorObserver (below) recieves the data, and in combination of Amazon Web Services (AWS) Cloudwatch, alerts can be set which then send alerts to devices N the infrastructure team to investigate a problem.

The server is also the central entity that feeds the display and alerting system for the presence and locations of all known threats, defined by the presence of matches of faces from the crowd of the POI listing with a confidence level above the defined threshold. The server (J) keeps the aggregate of all the matches of POI by running a MatchConsumer (L) module which listens to the MatchProducer module in each of the ECD (C). Since people and POI may be moving around, the server (J) feeds a central or distributed display system which may be in a control center or command center (M). In addition, relevant match information may also be passed to security personnel and their handheld devices near each camera B. The display and the handheld devices may show the location, the face from the crowd that was matched with the POI listing and the confidence level of the match. The network of devices N receiving the information may be carried by security personnel to interdict the matched individual in the crowd and take further security action, thus keeping the fans in the Venue safe.

An additional key step occurs during the adding of POIs. Some images may be rejected because they are blurry. Other images may have low quality that may not be so easily detectable. One method to find these images is to compare against the embedding vectors of other POIs. Images that are too similar are rejected. An instantiation of this method is found in the detect_duplicates function of the Classifier method below.

Configurable Confidence Score: The Recognizer G's use of confidence scores to determine when the quality of the image of a tracked face improves enough (becoming less occluded, for instance) to be re-scrutinized by the recognition module, thereby improving the accuracy of the system, makes the system very reliable and usable for this purpose. In addition, each camera/ECD pair may be assigned a different confidence threshold which might be necessary due to ambient lighting conditions or position of the camera (which may not always be optimal due to external factors). To achieve this ability, Server (K) communicates to ECD (C), updated thresholds.

EXAMPLE

A more complete understanding of the illustrated embodiment may be attained by reference to the code excerpts provided in the computer program listing contained in the aforementioned incorporated-by-reference ASCII file named "sourceCode-ISOLatin1encode.txt" submitted herewith in compliance with MPEP 608.05, in which construction and operation of the modules shown in FIG. 1 is expressed in the Python programming language and comments embedded therein.

Described above and shown in the drawings are embodiments of the invention suitable for systems, apparatus and methods for digital data processing, digital image analysis, facial recognition, and/or computer-mediated security systems. Although some of the focus above is on systems and methods for excluding persons of interest from public events and/or venues, it will be appreciated that the teachings hereof maybe applied to other systems for digital data processing, digital image analysis, facial recognition, and/or computer-mediated security systems. Moreover, it will be appreciated that the embodiments illustrated and described herein are merely examples of the invention and that other embodiments may incorporate changes to those described herein within the ken of those skilled in the art.

In view of the foregoing, what is claimed is:

1. An edge computing-based system of detecting persons of interest, comprising:
   A. a server digital data processor that creates embeddings of facial images of each of a plurality of persons of interest and that downloads the embeddings to one or more edge computing devices local to a premises,
   B. one or more cameras, each of which acquires a stream of images of persons at the premises,
   C. one or more edge computing devices that are in communications coupling with the server digital data processor and the one or more cameras, each edge computing device processing a said stream of images to identify person of interest by converting each face in the stream of images to a vector, and finding a degree of similarity between each such vector and the downloaded embeddings,
   D. each edge computing device generating a match signal for a facial image for which a degree of similarity is above a threshold.

2. The system of claim 1, wherein each edge computing device executes multiple software modules that together perform facial detection.

3. The system of claim 2, wherein the multiple software modules include a face detection module that detects facial images in an image frame and that assigns each face a unique ID.

4. The system of claim 3, wherein the multiple software modules a face tracking module that tracks each face detected by the face detection module from frame to frame in the video stream and that recognizes that the face is either the same one or new entrant into the frame.

5. The system claim 2, wherein each edge detection device normalizes facial images to a preselected size.

6. The system of claim 2, wherein the multiple software modules include a face recognizer module to converting each face in the stream of images to a vector and to find a degree of similarity between each such vector and the downloaded embeddings.

7. The system of claim 2, wherein each edge detection device initializes a module to generate a match signal for facial images for which the degree of similarity is above that threshold.

8. An edge computing-based method of detecting persons of interest, comprising:
   A. creating, with a server digital data processor, embeddings of facial images of each of a plurality of persons of interest,
   B. downloading, from the server digital data processor to an edge computing device local to a premises, embeddings of the persons of interest,
   C. acquiring, with a camera local to the premises, a stream of images of persons at the premises,
   D. processing, with the edge computing device, the stream of images to identify persons of interest, wherein the processing step includes
      i. converting each face in the stream of images to a vector, and
      ii. finding a degree of similarity between each such vector and the downloaded embeddings,
   E. generating a match signal for a facial image for which a degree of similarity is above a threshold.

9. An edge computing-based method according to claim 8, comprising transmitting to one or more handheld devices a facial image for which a match signal was generated.

10. An edge computing-based method of claim 9, comprising transmitting to the one or more handheld devices the degree of similarity on which the match signal was based.

11. The edge computing-based method of claim 8, wherein the downloading step includes downloading with the embeddings an indication of an algorithm by which they were generated.

12. The edge computing-based method of claim 11, wherein subsequent to a change in the algorithm the changed algorithm is downloaded to the edge computing device before the embeddings are downloaded.

* * * * *